(12) United States Patent
Glockner et al.

(10) Patent No.: US 7,329,710 B2
(45) Date of Patent: *Feb. 12, 2008

(54) RADIATION-CURABLE RESINS BASED ON KETONE-ALDEHYDE AND/OR UREA-ALDEHYDE RESINS AND A PROCESS FOR PREPARING THEM

(75) Inventors: Patrick Glockner, Ratingen (DE); Lutz Mindach, Marl (DE)

(73) Assignee: Degussa AG, Düsseldorf (DE)

( * ) Notice: Subject to any disclaimer, the term of this patent is extended or adjusted under 35 U.S.C. 154(b) by 84 days.

This patent is subject to a terminal disclaimer.

(21) Appl. No.: 10/921,989

(22) Filed: Aug. 20, 2004

(65) Prior Publication Data

US 2005/0043501 A1    Feb. 24, 2005

(30) Foreign Application Priority Data

Aug. 22, 2003 (DE) ................. 103 38 562

(51) Int. Cl.
*C08L 61/24* (2006.01)
(52) U.S. Cl. ............... 525/509; 525/521; 528/227; 528/246; 528/259
(58) Field of Classification Search ........... 528/227; 525/521
See application file for complete search history.

(56) References Cited

U.S. PATENT DOCUMENTS

| | | | | |
|---|---|---|---|---|
| 3,878,021 | A | * | 4/1975 | Tiedeman ............... 156/331.3 |
| 4,070,500 | A | | 1/1978 | Leitner et al. |
| 4,205,018 | A | | 5/1980 | Nagasawa et al. |
| 5,705,599 | A | * | 1/1998 | Felixberger et al. ........ 528/227 |
| 5,739,214 | A | | 4/1998 | Schunck |
| 5,962,582 | A | * | 10/1999 | Lange ................... 524/592 |
| 6,096,797 | A | * | 8/2000 | Prantl et al. ............ 522/174 |
| 6,452,003 | B1 | | 9/2002 | Ewald et al. |
| 6,552,154 | B1 | | 4/2003 | Kohlstruk et al. |
| 6,613,863 | B2 | | 9/2003 | Kohlstruk et al. |
| 6,730,628 | B2 | | 5/2004 | Kohlstruk et al. |
| 6,794,482 | B2 | | 9/2004 | Gloeckner et al. |
| 6,797,787 | B2 | | 9/2004 | Scholz et al. |
| 6,800,714 | B2 | | 10/2004 | Kohlstruk et al. |
| 6,881,785 | B2 | | 4/2005 | Glöckner et al. |
| 7,001,973 | B2 | | 2/2006 | Kohlstruk et al. |
| 7,005,002 | B2 | | 2/2006 | Glöckner et al. |
| 7,033,522 | B2 | | 4/2006 | Jonderko et al. |
| 7,101,958 | B2 | | 9/2006 | Gloeckner et al. |
| 7,135,522 | B2 | | 11/2006 | Gloeckner et al. |
| 7,138,465 | B2 | | 11/2006 | Gloeckner et al. |
| 2004/0122172 | A1 | | 6/2004 | Glockner et al. |
| 2005/0010016 | A1 | | 1/2005 | Glockner et al. |
| 2005/0043501 | A1 | | 2/2005 | Gloeckner et al. |
| 2005/0080222 | A1 | | 4/2005 | Andrejewski et al. |
| 2005/0124716 | A1 | * | 6/2005 | Gloeckner et al. .......... 522/113 |
| 2005/0124780 | A1 | | 6/2005 | Glöckner et al. |
| 2006/0074217 | A1 | | 4/2006 | Gloeckner et al. |

FOREIGN PATENT DOCUMENTS

| | | |
|---|---|---|
| DE | 2345624 | 4/1974 |
| DE | 2438724 | 7/1975 |
| DE | 2438712 | 2/1976 |
| DE | 2847796 | 5/1979 |
| DE | 240318 A3 | 10/1986 |
| DE | 43 44 125 | 6/1995 |
| EP | 0736074 | 9/1996 |
| EP | 0902065 A1 | 3/1999 |
| WO | WO 95/17476 | 6/1995 |

OTHER PUBLICATIONS

U.S. Appl. No. 10/919,292, filed Aug. 17, 2004, Gloeckner, et al.
U.S. Appl. No. 10/586,587, filed Jul. 20, 2006, Gloeckner, et al.
U.S. Appl. No. 11/577,955, filed Apr. 25, 2007, Gloeckner, et al.
U.S. Appl. No. 11/814,306, filed Jul. 19, 2007, Gloeckner, et al.
U.S. Appl. No. 11/577,139, filed Apr. 12, 2007, Gloeckner, et al.
Data from esp@cenet database : English Abstract of GB 1407898 which corresponds to DE 2345624, Oct. 1, 1975.
Data from esp@cenet database : English Abstract of US 5,739,214 which corresponds to EP0736074, Jul. 14, 1998, Schunck Apr. 1998.
Data from esp@cenet database : English Abstract of EP0902065, Mar. 17, 1998.
Data from esp@cenet database : English Abstract of US 4,205,018 which corresponds to DE 2847796, May 17, 1980, Nagasawa et al.
Patent Abstracts of Japan 09143396; Jun. 3, 1997.

* cited by examiner

*Primary Examiner*—Marc S. Zimmer
(74) *Attorney, Agent, or Firm*—Oblon, Spivak, McClelland, Maier & Neustadt, P.C.

(57) ABSTRACT

A radiation-curable resin, containing a reaction product of A) at least one ketone-aldehyde resin; and/or B) at least one urea-aldehyde resin; and C) at least one compound having at least one ethylenically unsaturated moiety and at least one moiety which is reactive toward A) and/or B), is prepared by reacting components A), B) and C).

41 Claims, No Drawings

RADIATION-CURABLE RESINS BASED ON KETONE-ALDEHYDE AND/OR UREA-ALDEHYDE RESINS AND A PROCESS FOR PREPARING THEM

BACKGROUND OF THE INVENTION

1. Field of the Invention

The present invention relates to radiation-curable resins based on ketone-aldehyde and to urea-aldehyde resins and to a process for preparing them.

2. Description of the Related Art

Radiation-curable coating materials have increasingly gained importance within recent years, due to, for example, the low VOC (volatile organic compounds) content of these systems.

The film-forming components in the coating material are of relatively low molecular mass and hence of low viscosity, so that there is no need for high fractions of organic solvents. Durable coatings are obtained by the formation, following application of the coating material, of a high molecular mass, polymeric network by means of crosslinking reactions initiated, for example, by UV light.

Ketone-aldehyde resins are used in coating materials, for example, as additive resins in order to enhance certain properties such as initial drying rate, gloss, hardness or scratch resistance. Due to their relatively low molecular weight, customary ketone-aldehyde resins possess a low melt viscosity and solution viscosity and therefore also serve as film-forming functional fillers in coating materials.

Ketone-aldehyde resins normally possess hydroxyl groups and can therefore be crosslinked only with, for example, polyisocyanates or amine resins. These crosslinking reactions are usually initiated and/or accelerated thermally.

For radiation-initiated crosslinking reactions, in accordance with cationic and/or free-radical reaction mechanisms, the ketone-aldehyde resins are not suitable.

Accordingly, the ketone-aldehyde resins are normally added to radiation-curable coating systems as, for example, a film-forming component, but not as a crosslinking component. Due to the uncrosslinked resin fractions, the resistance of such coatings to gasoline, chemicals or solvents, for example, is often relatively low.

WO 95/17476, DE 23 45 624, EP 736 074, DE 28 47 796, DD 24 0318, DE 24 38 724, and JP 09143396 describe the use of ketone-aldehyde resins and ketone resins, e.g., cyclohexanone-formaldehyde resins, in radiation-curable systems. Radiation-induced crosslinking reactions of these resins are not described.

EP 0 902 065 describes the use of nonradiation-curable resins formed from urea (derivatives), ketone or aldehydes as an added component in a mixture with radiation-curable resins.

DE 24 38 712 describes radiation-curing printing inks composed of film-forming resins, ketone resins and ketone-formaldehyde resins, and polymerizable components such as polyfunctional acrylate esters of polyhydric alcohols. To the skilled worker it is obvious that radiation-induced crosslinking reaction of the modified ketone-aldehyde resins and ketone resins can only come about through the use of unsaturated fatty acids. It is known, however, that resins having a higher oil content tend toward unwanted yellowing.

U.S. Pat. No. 4,070,500 describes the use of nonradiation-curable ketone-formaldehyde resins as a film forming component in radiation-curable inks.

SUMMARY OF THE INVENTION

It is an object of the present invention to provide ketone-aldehyde resins and/or urea aldehyde resins to give radiation-curable resins which are stable to hydrolysis, are resistant, and possess a high yellowing resistance.

This and other objects have been achieved by the present invention the first embodiment of which includes a radiation-curable resin, comprising:

a reaction product of
A) at least one ketone-aldehyde resin; and/or
B) at least one urea-aldehyde resin; and
C) at least one compound having at least one ethylenically unsaturated moiety and at least one moiety which is reactive toward A) and/or B).

In another embodiment, the present invention provides a radiation-curable resin obtained by polymer-analogously reacting
A) at least one ketone-aldehyde resin; and/or
B) at least one urea-aldehyde resin; and
C) at least one compound having at least one ethylenically unsaturated moiety and at least one moiety which is reactive toward A) and/or B).

In yet another embodiment, the present invention provides a process for preparing a radiation-curable resin, comprising:
polymer-analogously reacting;
A) at least one ketone-aldehyde resin; and/or
B) at least one urea-aldehyde resin; with
C) at least one compound having at least one ethylenically unsaturated moiety and at least one moiety which is reactive toward A) and/or B).

DETAILED DESCRIPTION OF THE INVENTION

Surprisingly it has been possible to achieve the above objects by providing ketone-aldehyde resins and/or urea-aldehyde resins in polymer-analogous reactions with ethylenically unsaturated moieties.

It has been found that these ketone-aldehyde resins and/or urea-aldehyde resins which possess ethylenically unsaturated moieties, in the presence of suitable compounds such as photoinitiators, and in the presence if desired of suitable photosensitizers, can, by induction with, for example, UV light, be converted into a polymeric network which depending on the fraction of ethylenically unsaturated groups possesses resistance and hardness which is high to very high.

The present invention provides radiation-curable resins comprising
A) at least one ketone-aldehyde resin; and/or
B) at least one urea-aldehyde resin; and
C) at least one compound comprising at least one ethylenically unsaturated moiety having at the same time at least one moiety which is reactive toward A) and/or B).

The present invention also provides radiation-curable resins obtained by polymer-analogous reaction of
A) at least one ketone-aldehyde resin; and/or
B) at least one urea-aldehyde resin; and
C) at least one compound comprising at least one ethylenically unsaturated moiety and at the same time at least one moiety which is reactive toward A) and/or B).

Polymer-analogous reaction means that a polymer is further reacted either to add functional groups or to block or protect functional groups.

It is also possible for some of the ketone-aldehyde resins A) and/or urea-aldehyde resins B) to be replaced by further suitable polymers, such as hydroxy-functional polyethers, polyesters and/or polyacrylates, for example. In this case mixtures of these polymers with the ketone-aldehyde resins and/or urea-aldehyde resins can directly be reacted polymer-analogously with component C). It has been found that first of all it is also possible to prepare adducts of the ketone-aldehyde resins and/or urea-aldehyde resins with, for example, hydroxy-functional polyethers, polyesters and/or polyacrylates using the diisocyanates and/or triisocyanates specified below, and only then to react said adducts polymer-analogously with component C). In contrast to the "plain" ketone-aldehyde resins and/or urea-aldehyde resins it is possible by this means better to establish properties such as flexibility and hardness, for example.

Suitable ketones for preparing the ketone-aldehyde resins (component A) include all ketones, especially acetone, acetophenone, methyl ethyl ketone, heptan-2-one, pentan-3-one, methyl isobutyl ketone, cyclopentanone, cyclododecanone, mixtures of 2,2,4- and 2,4,4-trimethylcyclopentanone, cycloheptanone and cyclooctanone, cyclohexanone and all alkyl-substituted cyclohexanones having one or more alkyl radicals containing in total 1 to 8 carbon atoms, individually or in a mixture. Preferred examples that may be mentioned of alkyl substituted cyclohexanones include 4-tert-amylcyclohexanone, 2-sec-butylcyclohexanone, 2-tert-butylcyclohexanone, 4-tert-butylcyclohexanone, 2-methylcyclohexanone, and 3,3,5-trimethylcyclohexanone.

In general, however, any of the ketones said in the literature to be suitable for ketone resin syntheses, more generally all C—H-acidic ketones, can be used. Preference is given to ketone-aldehyde resins based on the ketones acetophenone, cyclohexanone, 4-tert-butylcyclohexanone, 3,3,5-trimethylcyclohexanone, and heptanone, alone or in a mixture.

Suitable aldehyde components of the ketone-aldehyde resins (component A) include in principle linear or branched aldehydes, such as formaldehyde, acetaldehyde, n-butyraldehyde and/or isobutyraldehyde, valeraldehyde, and dodecanal. In general it is possible to use any of the aldehydes said in the literature to be suitable for ketone resin syntheses. It is preferred, however to use formaldehyde, alone or in mixtures.

The requisite formaldehyde is normally used in the form of an aqueous or alcoholic (e.g. methanol or butanol) solution with a strength of from about 20 to 40% by weight. The strength of the solution includes all values and subvalues therebetween, especially including 22, 24, 26, 28, 30, 32, 34, 36 and 38% by weight. Other forms of formaldehyde, such as para-formaldehyde or trioxane, for example, are likewise possible. Aromatic aldehydes, such as benzaldehyde, can likewise be present in a mixture with formaldehyde.

Particularly preferred starting compounds used for component A) are acetophenone, cyclohexanone, 4-tert-butylcyclohexanone, 3,3,5-trimethylcyclohexanone, and heptanone, alone or in a mixture, and formaldehyde.

The preparation and the monomers for component B) are described in EP 0 271 776:

As component B) use is made of urea-aldehyde resins using a urea of the general formula (i)

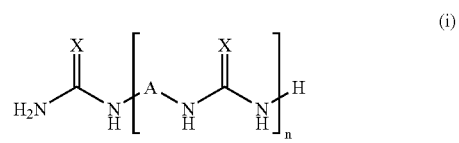

in which X is oxygen or sulfur, A is an alkylene radical, and n is from 0 to 3, with from 1.9 (n+1) to 2.2 (n+1) mol of an aldehyde of the general formula (ii)

in which $R_1$ and $R_2$ are hydrocarbon radicals (e.g. alkyl, aryl and/or alkylaryl radicals) each having up to 20 carbon atoms and/or formaldehyde.

Suitable ureas of the general formula (i) where n=0 are, for example, urea and thiourea, where n=1, methylenediurea, ethylenediurea, tetramethylenediurea and/or hexamethylenediurea and also mixtures thereof. Preference is given to urea.

Suitable aldehydes of the general formula (ii) are, for example, isobutyraldehyde, 2-methylpentanal, 2-ethylhexanal, and 2-phenylpropanal, and also mixtures thereof. Preference is given to isobutyraldehyde.

Formaldehyde can be used in aqueous form, which may also include, in part or entirely, alcohols such as methanol or ethanol, for example, or else as paraformaldehyde and/or trioxane.

Generally speaking, all monomers described in the literature for the preparation of aldehyde-urea resins are suitable.

Typical compositions are described, in, for example, DE 27 57 220, DE A 27 57 176, and EP0271 776.

The radiation-curable resins on which the invention is based are obtained by polymer-analogous reaction of the ketone-aldehyde resins and/or of the urea-aldehyde resins, in the melt or in a suitable solvent solution, with component C). Suitability is possessed by maleic anhydride, (meth)acrylic acid derivatives such as (meth)acryloyl chloride, glycidyl (meth)acrylate, (meth)acrylic acid and/or the low molecular mass alkyl esters and/or anhydrides thereof, alone or in a mixture. It is also possible to obtain radiation-curable resins by reacting the ketone-aldehyde resins and urea-aldehyde resins with isocyanates possessing an ethylenically unsaturated moiety, such as (meth)acryloyl isocyanate, α,α-dimethyl-3-isopropenylbenzyl isocyanate, (meth)acryloylalkyl isocyanate with alkyl spacers possessing from 1 to 12, preferably from 2 to 8, more preferably from 2 to 6 carbon atoms, such as methacryloylethyl isocyanate and methacryloylbutyl isocyanate, for example. Further reaction products which have proven suitable are those of hydroxyalkyl(meth) acrylates whose alkyl spacers have from 1 to 12, preferably from 2 to 8, more preferably from 2 to 6 carbon atoms and diisocyanates such as, for example, cyclohexane diisocyanate, methylcyclohexane diisocyanate, ethylcyclohexane diisocyanate, propylcyclohexane diisocyanate, methyldiethylcyclohexane diisocyanate, phenylene diisocyanate, tolylene diisocyanate, bis(isocyanatophenyl)methane, propane diisocyanate, butane diisocyanate, pentane diisocyanate, hexane diisocyanate, such as hexamethylene diisocyanate (HDI) or 1,5-diisocyanato-2-methylpentane (MPDI), heptane diisocyanate, octane diisocyanate, nonane diisocyanate, such as 1,6-diisocyanato-2,4,4-trimethylhexane or 1,6-diisocyanato-2,2,4-trimethylhexane (TMDI), nonane triisocyanate, such as 4-isocyanatomethyloctane 1,8-diisocyanate (TIN), decane di- and triisocyanate, undecane di- and triisocyanate, dodecane di- and triisocyanates, isophorone diisocyanate (IPDI), bis(isocyanatomethylcyclohexyl)methane ($H_{12}$MDI), isocyanatomethylmethylcyclohexyl isocyanate, 2,5(2,6)-bis(isocyanatomethyl)bicycle[2.2.1]heptane (NBDI), 1,3 bis(isocyanatomethyl)cyclohexane (1,3-$H_6$-XDI) or 1,4 bis(isocyanatomethyl)cyclohexane (1,4-$H_6$-XDI), alone or in a mixture. Examples that may be mentioned include the reaction products in a 1:1 molar ratio of hydroxyethyl acrylate and/or hydroxyethyl methacrylate with isophorone diisocyanate and/or $H_{12}$MDI and/or HDI.

Another preferred class of polyisocyanates are the compounds having more than two isocyanate groups per molecule which are prepared by trimerizing, allophanatizing, biuretizing and/or urethaneizing the simple diisocyanates, examples being the reaction products of these simple diisocyanates, such as IPDI, HDI and/or HMDI, for example, with polyhydric alcohols (e.g., glycerol, trimethylolpropane, pentaerythritol) and/or polyfunctional polyamines or else the triisocyanurates obtainable by trimerizing the simple diisocyanates, such as IPDI, HDI, and HMDI, for example.

If desired it is possible to use a suitable catalyst for preparing the resins of the invention. Suitable compounds are all those known in the literature which accelerate an OH—NCO reaction, such as diazabicyclooctane (DABCO) or dibutyltin dilaurate (DBTL) for example.

The functionality of the resins obtained ranges from low to high in accordance with the ratio of the reactants to one another. Through the choice of reactants it is also possible to set the subsequent hardness of the crosslinked film. If, for example, a hard resin such as cyclohexanone-formaldehyde resin is reacted with α,α-dimethyl-3-isopropenylbenzyl isocyanate, the resulting products are harder than those obtained through the use of (meth)acryloylethyl isocyanate and/or hydroxyethyl acrylate-isophorone diisocyanate adducts; the flexibility, however, is then lower. It has also been found that the reactivity of ethylenically unsaturated compounds with little steric hindrance—such as of hydroxyethyl acrylate, for example—is higher than in the case of those which are sterically hindered, such as α,α-dimethyl-3-isopropenylbenzyl isocyanate, for example.

In principle it is possible to consider incorporating ethylenically unsaturated moieties even during the actual preparation of the ketone-aldehyde/urea-aldehyde resins. By way of the proportional use of suitable monomers, such as polymerizable ketones having olefinic double bonds, for example, any desired degrees of functionalization can be set. The disadvantage of this procedure lies in the limited availability of suitable monomer building blocks.

It is also possible to replace some of the ketone-aldehyde resins and/or urea-aldehyde resins by further hydroxy-functionalized polymers such as hydroxy-functional polyethers, polyesters and/or polyacrylates, for example. In this case, mixtures of these polymers with the ketone-aldehyde resins and/or urea-aldehyde resins can be reacted polymer-analogously with component C). It has been found that first of all it is also possible to prepare adducts of the ketone-aldehyde resins and/or urea-aldehyde resins with, for example, hydroxy-functional polyethers, polyesters and/or polyacrylates using the abovementioned diisocyanates and/or triisocyanates, and only then are these adducts reacted polymer-analogously with component C). In contrast to the "plain" ketone-aldehyde resins and/or urea-aldehyde resins it is possible by this means better to set properties such as flexibility and hardness, for example. The further hydroxy-functional polymers generally possess number average molecular weights Mn of between 200 and 10 000 g/mol, preferably between 300 and 5 000 g/mol. The number average molecular weight includes all values and subvalues therebetween, especially including 300, 400, 500, 1000, 1500, 2000, 2500, 3000, 3500, 4000, 4500, 5000, 5500, 6000, 6500, 7000, 7500, 8000, 8500, 9000 and 9500 g/mol.

The present invention also provides a process for preparing radiation-curable resins by polymer-analogously reacting A) ketone-aldehyde resins; and/or
B) urea-aldehyde resins; with
C) compounds which contain at least one ethylenically unsaturated moiety and at the same time at least one moiety which is reactive toward A) and B), with the use if desired of further hydroxy-functional polymers.

The resins on which the invention is based are prepared in the melt or in a suitable, organic solvent solution of the ketone-aldehyde resins and/or urea-aldehyde resins. Said organic solvent may if desired likewise possess unsaturated moieties, in which case it acts directly as a reactive diluent in the subsequent application.

For this purpose, in one preferred embodiment I, the compound C), in the presence if desired of a suitable catalyst, is added to the solution or melt of the ketone-aldehyde resins A) and/or urea-aldehyde resins B).

The temperature of the reaction is selected in accordance with the reactivity of component C). Where isocyanates are used as component C), suitable temperatures have been found to be between 30 and 150° C., preferably between 50 and 140° C. The temperature includes all values and subvalues therebetween, especially including 35, 40, 45, 50, 55, 60, 65, 70, 75, 80, 85, 90, 95, 100, 105, 110, 115, 120, 125, 130, 135, 140 and 145° C.

The solvent that may be present can be separated off if desired after the end of the reaction, in which case a powder of the product of the invention is generally obtained.

It has proven advantageous to react 1 mol of the ketone-aldehyde resins and/or urea-aldehyde resins—based on $M_n$ number average molecular weight—with from 0.5 to 15 mol, preferably from 1 to 10 mol, in particular from 2 to 8 mol of the unsaturated compound (component C). The amount of component C) includes all values and subvalues therebetween, especially including 1, 1.5, 2, 2.5, 3, 3.5, 4, 4.5, 5, 5.5, 6, 6.5, 7, 7.5, 8, 9, 10, 11, 12, 13 and 14 mol.

In a preferred embodiment II the compound C), in the presence if desired of a suitable catalyst, is added to the solution or melt of the ketone-aldehyde resins A) and/or urea-aldehyde resins B) and the hydroxy-functional polymer, such as polyether, polyester and/or polyacrylate, for example.

The temperature of the reaction is selected in accordance with the reactivity of component C). Where isocyanates are used as component C), suitable temperatures have been found to be between 30 and 150° C., preferably between 50 and 140° C. The temperature includes all values and subvalues therebetween, especially including 35, 40, 45, 50, 55, 60, 65, 70, 75, 80, 85, 90, 95, 100, 105, 110, 115, 120, 125, 130, 135, 140 and 145° C.

The solvent that may be present can be separated off if desired after the end of the reaction, in which case a powder of the product of the invention is generally obtained.

It has proven advantageous to react 1 mol of the ketone-aldehyde resins and/or urea-aldehyde resins and/or additional polymers—based on $M_n$—with from 0.5 to 15 mol, preferably from 1 to 10 mol, in particular from 2 to 8 mol of the unsaturated compound (component C). The amount of component C) includes all values and subvalues therebetween, especially including 1, 1.5, 2, 2.5, 3, 3.5, 4, 4.5, 5, 5.5, 6, 6.5, 7, 7.5, 8, 9, 10, 11, 12, 13 and 14 mol.

In a preferred embodiment III a di- and trifunctional isocyanate is added to the solution or melt of the ketone-aldehyde resins A) and/or urea-aldehyde resins B) and the hydroxy-functional polymer, such as polyether, polyester and/or polyacrylate, for example and a hydroxy-functional preadduct is prepared. Only then is the compound C), in the presence if desired of a suitable catalyst, added.

The temperature of the reaction is selected in accordance with the reactivity of component C). Where isocyanates are used as component C), suitable temperatures have been found to be between 30 and 150° C., preferably between 50 and 140° C. The temperature includes all values and subvalues therebetween, especially including 35, 40, 45, 50, 55, 60, 65, 70, 75, 80, 85, 90, 95, 100, 105, 110, 115, 120, 125, 130, 135, 140 and 145° C.

The solvent that may be present can be separated off if desired after the end of the reaction, in which case a powder of the product of the invention is generally obtained.

It has proven advantageous to react 1 mol of the ketone-aldehyde resins and/or urea-aldehyde resins and/or additional polymers—based on $M_n$—with from 0.5 to 15 mol, preferably from 1 to 10 mol, in particular from 2 to 8 mol of the unsaturated compound (component C). The amount of component C) includes all values and subvalues therebetween, especially including 1, 1.5, 2, 2.5, 3, 3.5, 4, 4.5, 5, 5.5, 6, 6.5, 7, 7.5, 8, 9, 10, 11, 12, 13 and 14 mol.

In the presence of suitable photoinitiators, and in the presence if desired of suitable photosensitizers, these resins can be converted by irradiation into polymeric, insoluble networks which, depending on the level of ethylenically unsaturated groups present, produce elastomers to thermosets.

Having generally described this invention, a further understanding can be obtained by reference to certain specific examples which are provided herein for purposes of illustration only, and are not intended to be limiting unless otherwise specified.

EXAMPLES

Example 1

Synthesis took place by reaction of 1 mol of an anhydrous cyclohexanone-formaldehyde resin (water content<0.2% by weight, OHN=105 mg KOH/g (acetic anhydride method), Mn~650 g/mol, against polystyrene) with 1.2 mol of a reaction product of IPDI and hydroxyethyl acrylate in a ratio of 1:1 in the presence of 0.2% (on resin) of 2,6 bis(tert-butyl)-4 methylphenol (Ralox BHT, Degussa AG) and 0.1% (on resin) of dibutyltin dilaurate, 65% strength in methoxypropyl acetate, at 80° C. under nitrogen in a three-necked flask with stirrer, reflux condenser, and temperature sensor until an NCO number of less than 0.1 was reached. The pale, clear solution obtained possessed a dynamic viscosity of 11.5 Pa·s.

The resin solution was admixed with Darocur 1173 (Ciba Specialty Chemicals, 1.5% based on resin solids) and applied to a glass plate and the solvent was evaporated at elevated temperature (30 min, 80° C.). The films were then cured by means of UV light (medium-pressure mercury lamp, 70 W/optical filter 350 nm) for about 12 seconds. The films, previously soluble, were no longer soluble in methyl ethyl ketone.

German patent application 10338562.2 filed Aug. 22, 2003, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A radiation-curable resin, comprising:
   a reaction product of comprising reacted units of
   A) at least one ketone-aldehyde resin; and/or
   B) at least one urea-aldehyde resin; and
   C) at least one compound having at least one ethylenically unsaturated moiety and at least one moiety which is reactive toward A) and/or B).
   wherein the reactive moiety of C) is reacted with component A) and/or B) and
   wherein C) is (meth)acrylic acid and/or derivatives thereof, isocyanates having an ethylenically unsaturated moiety, or a reaction product of at least one hydroxyalkyl(meth)acrylate wherein alkyl spacers possess 1 to 12 carbon atoms with diisocyanates and/or polyisocyanates in a 1:1 moral ratio.

2. A radiation-curable resin obtained by polymer-analogously reacting
   A) at least one ketone-aldehyde resin; and/or
   B) at least one urea-aldehyde resin; and
   C) at least one compound having at least one ethylenically unsaturated moiety and at least one reactive moiety that is reactive toward A) and/or B),
   wherein the reactive moiety of C) is reacted with component A) and/or B) and
   wherein C) is (meth)acrylic acid and/or derivatives thereof, isocyanates having an ethylenically unsaturated moiety, or a reaction product of at least one hydroxyalkyl(meth)acrylate wherein alkyl spacers possess 1 to 12 carbon atoms with diisocyanates and/or polyisocyanates in a 1:1 moral ratio.

3. The radiation-curable resin as claimed in claim 1, wherein said reaction product further comprises reacted units of D) at least one further hydroxyl-functionalized polymer.

4. The radiation-curable resin as claimed in claim 3, wherein D) is at least one hydroxyl-functionalized polymer selected from the group consisting of polyethers, polyesters, polyacrylate and mixtures thereof.

5. The radiation-curable resin as claimed in claim 3, wherein the reaction product is obtained by polymer-analogously reacting a mixture comprising the hydroxyl-functionalized polymer D), the ketone-aldehyde resin A) and/or the urea-aldehyde resin B) with the isocyanate compound C).

6. The radiation-curable resin as claimed in claim 3, obtained by preparing a first adduct of the ketone-aldehyde resin A) and/or the urea-aldehyde resin B) with the further polymer D), using a diisocyanate and/or a triisocyanate, and reacting the first adduct polymer-analogously with component C).

7. The radiation-curable resin as claimed in claim 1, wherein the reaction product comprises reacted units of A) comprising C—H-acidic ketones.

8. The radiation-curable resin as claimed in claim 1, wherein the reaction product comprises reacted units of A), and
wherein A) comprises reacted units of at least one ketone selected from the group consisting of acetone, acetophenone, methyl ethyl ketone, heptan-2-one, pentan-3-one, methyl isobutyl ketone, cyclopentanone, cyclododecanone, mixtures of 2,2,4-trimethylcyclopentanone and 2,4,4-trimethylcyclopentanone, cycloheptanone, cyclooctanone, cyclohexanone and mixtures thereof.

9. The radiation-curable resin as claimed in claim 1, wherein the reaction product comprises reacted units of A), and
wherein A) comprises reacted units of one or more alkyl-substituted cyclohexanones having one or more alkyl radicals containing in total 1 to 8 carbon atoms, individually or in a mixture.

10. The radiation-curable resin as claimed in claim 9, wherein A) comprises reacted units of at least one cycloketone selected from the group consisting of 4-tert-amylcyclohexanone, 2-sec-butylcyclohexanone, 2-tert-butylcyclohexanone, 4-tert-butylcyclohexanone, 2-methylcyclohexanone, 3,3,5-trimethylcyclohexanone and mixtures thereof.

11. The radiation-curable resin as claimed in claim 1, wherein the reaction product comprises reacted units of A), and
wherein A) comprises reacted units of at least one member selected from the group consisting of acetophenone, cyclohexanone, 4-tert-butylcyclohexanone, 3,3,5-trimethylcyclohexanone, heptanone and mixtures thereof.

12. The radiation-curable resin as claimed in claim 1, wherein the reaction product comprises reacted units of A), and
wherein A) comprises reacted units of at least one member selected from the group consisting of formaldehyde, acetaldehyde, n-butyraldehyde, isobutyraldehyde, valeraldehyde, dodecanal, and mixtures thereof.

13. The radiation-curable resin as claimed in claim 12, wherein A) comprises reacted units of at least one member selected from the group consisting of formaldehyde, paraformaldehyde, trioxane and mixtures thereof.

14. The radiation-curable resin as claimed in claim 1, wherein the reaction product comprises reacted units of A), and
wherein A) comprises reacted units of 1) at least one compound selected from the group consisting of acetophenone, cyclohexanone, 4-tert-butylcyclohexanone, 3,3,5-trimethylcyclohexanone, heptanone, and mixtures thereof, and 2) formaldehyde.

15. The radiation-curable resin as claimed in claim 1, wherein the reaction product comprises reacted units of B), and
wherein B) comprises reacted units of at least one urea of formula (i)

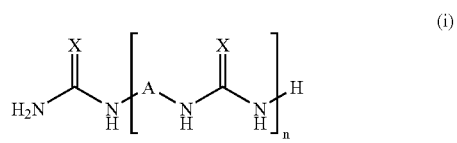

wherein
X is oxygen or sulfur,
A is an alkylene radical, and
n is from 0 to 3, and from 1.9 (n+1) to 2.2 (n+1) mol of reacted units of at least one aldehyde of formula (ii)

wherein $R_1$ and $R_2$ are hydrocarbon radicals each having up to 20 carbon atoms and/or formaldehyde.

16. The radiation-curable resin as claimed in claim 1, wherein the reaction product comprises reacted units of B), and
wherein B) comprises reacted units of at least one member selected from the group consisting of urea, thiourea, methylenediurea, ethylenediurea, tetramethylenediurea, hexamethylenediurea and mixtures thereof.

17. The radiation-curable resin as claimed in claim 1, wherein the reaction product comprises reacted units of B), and
wherein B) comprises reacted units of at least one member selected from the group consisting of isobutyraldehyde, formaldehyde, 2-methylpentanal, 2-ethylhexanal, 2-phenylpropanal and mixtures thereof.

18. The radiation-curable resin as claimed in claim 1, wherein the reaction product comprises reacted units of B), and
wherein B) comprises reacted units of urea, isobutyraldehyde, and formaldehyde.

19. The radiation-curable resin as claimed in claim 1, wherein said component C) is selected from the group consisting of (meth)acryloyl chloride, glycidyl (meth)acrylate, (meth)acrylic acid, low molecular mass alkyl esters of (meth)acrylic acid, low molecular mass alkyl anhydrides of (meth)acrylic acid and mixtures thereof.

20. The radiation-curable resin as claimed in claim 1, wherein component C) comprises reacted units of at least one diisocyanate selected from the group consisting of cyclohexane diisocyanate, methylcyclohexane diisocyanate, ethylcyclohexane diisocyanate, propylcyclohexane diisocyanate, methyldiethylcyclohexane diisocyanate, phenylene diisocyanate, tolylene diisocyanate, bis(isocyanatophenyl)methane, propane diisocyanate, butane diisocyanate, pentane diisocyanate, hexamethylene diisocyanate (HDI), 1,5-diisocyanato-2-methylpentane (MPDI, heptane diisocyanate, octane diisocyanate, 1,6-diisocyanato-2,4,4-trimethylhexane, 1,6-diisocyanato-2,2,4-trimethylhexane (TMDI), 4-isocyanatomethyloctane 1,8-diisocyanate (TIN), decane di- and triisocyanate, undecane di- and triisocyanate, dodecane di- and triisocyanates, isophorone diisocyanate (IPDI), bis(isocyanatomethylcyclohexyl)methane ($H_{12}$MDI, isocyanatomethylmethylcyclohexyl isocyanate, 2,5(2,6) bis (isocyanatomethyl)bicyclo[2.2.1]heptane (NBDI), 1,3-bis (isocyanatomethyl)cyclohexane (1,3-H$_6$-XDI), 1,4 bis(isocyanatomethyl)cyclohexane (1,4-H$_6$-XDI) and mixtures thereof.

21. The radiation-curable resin as claimed in claim 20, wherein component C) comprises reacted units of a polyisocyanate prepared by trimerizing, allophanatizing, biuretizing and/or urethaneizing a diisocyanate.

22. The radiation-curable resin as claimed in claim 1, wherein component C) comprises reacted units of hydroxyethyl acrylate and/or hydroxyethyl methacrylate with isophorone diisocyanate and/or H$_{12}$MDI and/or HDI in a molar ratio of from 1:1 to 1:1.5.

23. The radiation-curable resin as claimed in claim 1, comprising 1 mol of the ketone-aldehyde resin and/or urea-aldehyde resin based on number average molecular weight and from 0.5 to 15 mol of the compound C).

24. A process for preparing a radiation-curable resin, comprising:
polymer-analogously reacting;
A) at least one ketone-aldehyde resin; and/or
B) at least one urea-aldehyde resin; with
C) at least one compound having at least one ethylenically unsaturated moiety and at least one reactive moiety that is reactive toward A) and/or B),
wherein the reacting forms a reaction product wherein the reactive moiety of C) is reacted with A) and/or B) and
wherein C) is (meth)acrylic acid and/or derivatives thereof, isocyanates having an ethylenically unsaturated moiety, or a reaction product of at least one hydroxyalkyl(meth)acrylate wherein alkyl spacers possess 1 to 12 carbon atoms with diisocyanates and/or polyisocyanates in a 1:1 moral ratio.

25. The process as claimed in claim 24, further comprising:
reacting D) at least one further hydroxy-functionalized polymer with A) and/or B), and C).

26. The process as claimed in claim 24, which is performed in the presence of a catalyst.

27. The process as claimed in claim 24, wherein the reacting is conducted in a melt or in a solvent.

28. The process as claimed in claim 24, wherein the compound C), optionally in the presence of a catalyst, is added to a solution or melt of the ketone-aldehyde resin A) and/or the urea-aldehyde resin B).

29. The process as claimed in claim 25, wherein the compound C), optionally in the presence of a catalyst, is added to a solution or melt of the ketone-aldehyde resin A) and/or the urea-aldehyde resin B) and the hydroxy-functional polymer D).

30. The process as claimed in claim 25, comprising:
adding a di- and/or trifunctional isocyanate to a solution or melt of the ketone-aldehyde resin A) and/or urea-aldehyde resin B) and the hydroxy-functional polymer D);
preparing a hydroxy-functional preadduct; and
subsequently adding the compound C), optionally in the presence of a catalyst.

31. The process as claimed in claim 24, wherein the reacting is conducted at temperatures between 30 and 150° C.

32. The process as claimed in claim 25, wherein said component D) is at least one member selected from the group consisting of polyethers, polyesters, polyacrylate and mixtures thereof.

33. A cured composition obtained by radiation curing a radiation-curable resin comprising a reaction product comprising reacted units of
A) at least one ketone-aldehyde resin; and/or
B) at least one urea-aldehyde resin; and
C) at least one compound having at least one ethylenically unsaturated moiety and at least one reactive moiety that is reactive toward A) and/or B)
wherein the reactive moiety of C) is reacted with component A) and/or B) and C) is methylacrylic acid and/or derivatives thereof, isocyanates having an ethylenically unsaturated moiety, or a reaction product of at least one hydroxyalkyl(meth)acrylate wherein alkyl spacers possess 1 to 12 carbon atoms with diisocyanates and/or polyisocyanates in a 1:1 moral ratio.

34. A cured composition obtained by radiation curing a radiation-curable resin obtained by polymer analogously reacting,
A) at least one ketone-aldehyde resin; and/or
B) at least one urea-aldehyde resin; and
C) at least one compound having at least one ethylenically unsaturated moiety and at least one reactive moiety that is reactive toward A) and/or B),
wherein the reactive moiety of C) is reacted with component A) and/or B) and C) is methylacrylic acid and/or derivatives thereof, isocyanates having an ethylenically unsaturated moiety, or a reaction product of at least one hydroxyalkyl(meth)acrylate wherein alkyl spacers possess 1 to 12 carbon atoms with diisocyanates and/or polyisocyanates in a 1:1 moral ratio.

35. The radiation-curable resin as claimed in claim 1, comprising:
a cyclohexanone-formaldehyde resin and a reaction product of isophorone di-isocyanate and hydroxyethylacrylate in a ratio of 1:1.

36. The radiation-curable resin as claimed in claim 1, which is curable with UV light.

37. The radiation-curable resin as claimed in claim 2, which is curable with UV light.

38. The radiation-curable resin as claimed in claim 1, further comprising at least one of a photoinitiator and a photo sensitizer.

39. The radiation-curable resin as claimed in claim 2, further comprising at least one of a photoinitiator and a photo sensitizer.

40. The radiation-curable resin as claimed in claim 1, wherein the resin is cross-linkable by radiation.

41. The radiation-curable resin as claimed in claim 2, wherein the resin is cross-linkable by radiation.

* * * * *